United States Patent [19]

White, III

[11] Patent Number: 5,126,933
[45] Date of Patent: Jun. 30, 1992

[54] SELF-LEARNING MEMORY UNIT FOR PROCESS CONTROLLER AND SELF-UPDATING FUNCTION GENERATOR

[76] Inventor: Charles A. White, III, 242 W. Haviland La., Stamford, Conn. 06903

[21] Appl. No.: 476,265

[22] Filed: Feb. 7, 1990

[51] Int. Cl.⁵ .............................................. G05B 13/04
[52] U.S. Cl. .................................... 364/148; 364/162
[58] Field of Search ............... 364/148, 160, 161–163, 364/172, 173, 500, 502

[56] References Cited

U.S. PATENT DOCUMENTS

| Re. 33,267 | 7/1990 | Kraus | 364/148 |
|---|---|---|---|
| 3,555,252 | 1/1971 | Garden | 364/148 |
| 3,697,957 | 10/1972 | Barron | 364/148 |
| 4,071,886 | 1/1978 | Eicher | 364/148 |
| 4,358,822 | 11/1982 | Sanchez | 364/151 |
| 4,360,336 | 11/1982 | Shepherd | 431/12 |
| 4,473,537 | 9/1984 | Ford, Jr. et al. | 423/239 |
| 4,490,791 | 12/1984 | Morrison | 364/431.02 |
| 4,563,734 | 1/1986 | Mori et al. | 364/151 |
| 4,577,270 | 3/1986 | Sugano et al. | 364/151 |
| 4,607,325 | 8/1986 | Horn | 364/151 |
| 4,676,734 | 6/1987 | Foley | 431/12 |
| 4,710,864 | 12/1987 | Li | 364/148 |
| 4,739,714 | 4/1988 | LaSpisa et al. | 110/187 |
| 4,740,886 | 4/1988 | Tanifuji et al. | 364/150 |
| 4,751,054 | 6/1988 | Watanabe | 422/111 |
| 4,878,165 | 10/1989 | Gotou et al. | 364/161 |
| 4,893,600 | 1/1990 | Holmes | 364/148 |

Primary Examiner—Jerry Smith
Assistant Examiner—Paul Gordon
Attorney, Agent, or Firm—St. Onge, Steward, Johnston & Reens

[57] ABSTRACT

A device and method are described with which a function generator output can be automatically obtained based on a meaningful reference input signal and updated as required in conjunction with a controller which regulates a process such as a variable element or a variable setpoint or the like. The device samples the controller setpoint, output and the input index. A memory section is used to store output values that were last found correct for the input index and are retrieved whenever said index value is encountered. The retrieved last-correct value for a particular input index is corrected with a modifier that is derived from a representative controller setpoint and controller output to produce a currently-correct output for regulation of the process. The last correct value for any one particular input index value is only updated after the latter index has changed so as to avoid interference with the normal operation of the controller. Several embodiments are described.

18 Claims, 6 Drawing Sheets

SELF-LEARNING MEMORY UNIT FOR PROCESS CONTROLLER AND SELF-UPDATING FUNCTION GENERATOR

FIELD OF THE INVENTION

This invention generally relates to process controllers and more particularly to a method and device for self-adjusting to variables encountered in and affecting the proficiency of process control.

BACKGROUND OF THE INVENTION

In a typical process controller, an input representing, for example, a desired process output is compared to the "actual" process output and causes the controller to set various process parameters, such as pump speeds, flow valve settings, etc., to achieve the desired equality. In the design or adaptation of a controller, the output value that satisfies the input preferably occurs well within the control range for the controller. This allows the controller to operate close to its optimum range.

A PID (proportional, integral and derivative) controller is excellent at identifying errors (such as direction and extent) and in resolving these errors with reiterative mathematical analysis. The PID controller is adaptable to any process control application with appropriate proportional, integral and derivative tuning constants because it does not need information of process characteristics for error resolution. However, when the process characteristics change, the tuning constants set at time of commissioning may no longer be optimal, thus requiring the controller to change its operational position along its operating range. It then frequently becomes necessary to change or "retune" the constants.

Adaptable gain and reset features are recent developments with which a PID controller can keep up with process characteristic changes and resolve errors more proficiently.

Function generators or segment characterizers, as they are also called, are used to provide a particular output curve in response to an input. As an example, the function generator can be used in a process control application where the output of the PID controller serves as the direct or indirect input to a function generator. The latter then provides an output that is adapted to regulate an element such as a throttle or valve and the like.

For example, a PID controller may provide an output that is a linear function of its input. The output, however, is applied to a flow-regulating element whose actual flow regulation characteristics are a non-linear function of the PID output. The PID controller adapts to the element's characteristic via its error analysis/resolution, but this may force the PID controller to an extreme operating range under some conditions. The insertion of a function generator, therefore, adapts to the non-linear characteristics curve of the element and allows the PID controller to respond only to deviations from that curve.

However, once the function generator has been configured and inserted, the configuration is constant until one elects to intervene and reconfigure the curve. If process and element characteristics change then the PID controller must again be relied upon to resolve errors.

A need for reconfiguration, typically arises near extreme ends of the operational range. For example, initially a 100% PID controller output signal could result in a function generator output of 73% to satisfy the process. If the process changes and an 85% function generator output would be required to satisfy the process, then this signal could not be generated unless the function generator is first re-configured.

SUMMARY OF THE INVENTION

With a self-learning memory device and method in accordance with the invention, one can maintain the operation of a PID controller close to its optimum and also automatically adjust for non-linear characteristics of a control element used in a process. The function generation for the non-linear element would become automatically derived, stored, and adjusted as the process is operated.

This is achieved in one technique in accordance with the invention with a device that is, for example, operationally-inserted between the controller of the process and the element that is used by the controller to vary the process. The device continually stores the last correct values of a process control signal that satisfies the process for respectively-desired input signals. A currently-correct control signal is generated by using the stored last correct control signal for the desired input and correcting this with a modifier signal that is derived by comparing the desired input and the current output from a controller used to control the process The currently-correct control signal is then applied to the element to regulate the process operation.

The device can be incorporated as part of a controller or can be a separate device that is inserted at an appropriate location. The placement of a device in accordance with the invention need not be in conjunction with a physical element, but as described herein can be located anywhere in a system in which a controller is used to resolve an error. The term process as used herein is, therefore, intended to include the various processes in which a controller and a device in accordance with the invention may be used.

With a device and method when applied in the cited example in accordance with the invention, non-linear characteristics of the control element varied by the controller to regulate the process are automatically adjusted for. For example, when the input signal is changed to a different value, the controller responds with a corresponding output. The new value for the input signal causes a retrieval of the last correct value for the process control that was found to satisfy the process for the new input signal. A currently-correct control signal is then obtained by combining the output of the controller with its setpoint (in this case the same as the input signal) and modifying the last correct value for the process control.

In this manner the controller operation can continue near its optimum with previously set tuning contacts, while gradual changes in the process and non-linear characteristics of process adjusting elements such as a pump or valve are compensated for.

It is, therefore, an object of the invention to provide a device and method with which a controller for a process can maintain optimum process control while other variations and non-linear characteristics in the process or its elements are adjusted for. It is a further object of the invention to provide a self-adapting function generator that can be used with a controller without interfering with normal controller functions while enabling the controller to remain at its optimal operation.

These and other objects and advantages of the invention can be understood from the following detailed description of several illustrative embodiments of the invention described in conjunction with the drawings

DETAILED DESCRIPTION OF DRAWINGS

Figure 1:
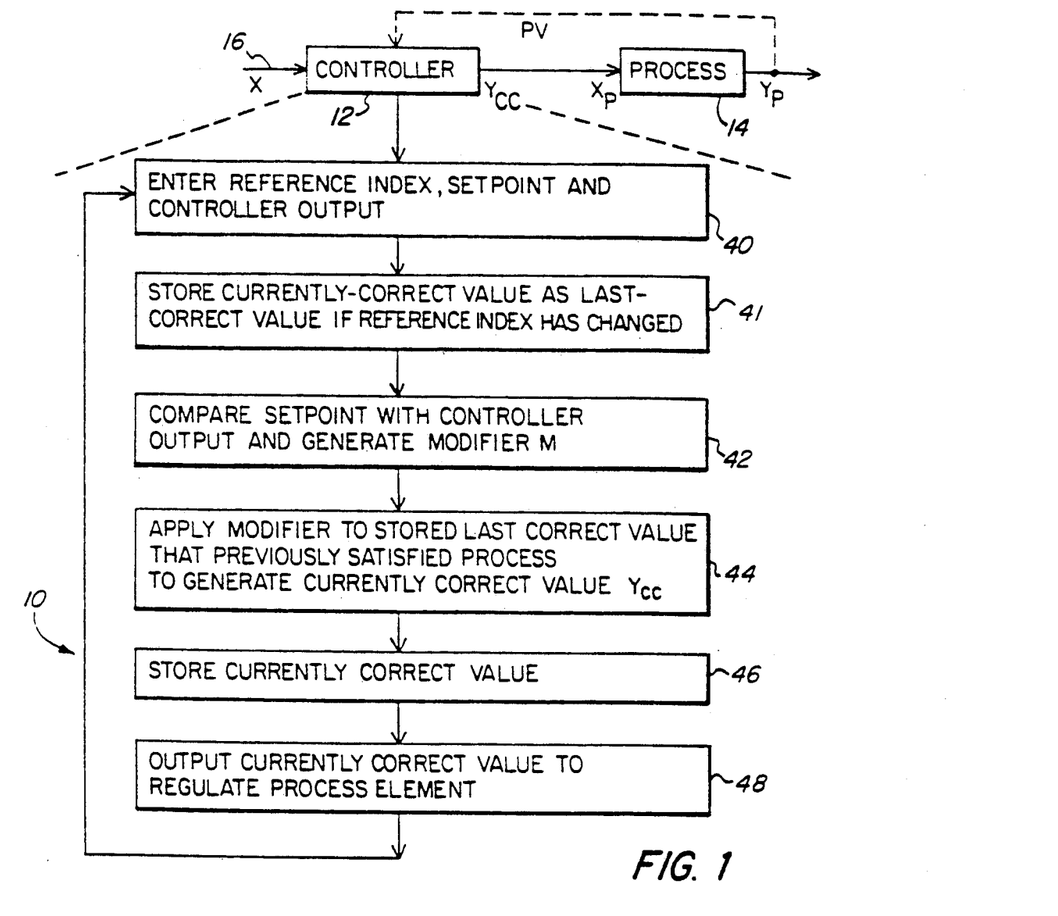
FIG. 1 is a flow diagram for a device in accordance with the invention.

FIG. 1 illustrates a technique 10 to implement the invention when a controller 12 operates a physical process 14 in which an element such as a pump or valve is regulated. A feedback signal PV from the process 14 may be returned to controller 12 as a process variable. The controller responds to an input signal X which in this case is representative of the desired or "setpoint" output $Y_P$ on line 16 to produce an output signal $Y_{CS}$ that is to be applied to the process element. The input signal X can be the setpoint signal Z for the controller or derived from it as a result of a relationship necessary to regulate the process. The input signal X typically is an index signal that is referenced to a maximum condition, for example, one that selects a desired output load level up to 100%.

The use of a digital controller 12 for regulating process 14 is very well known. Typically controller 12 operates with proportional, integral and derivative functions to reduce or resolve errors and is referred to as a PID controller. The PID controller must provide a response $Y_{CS}=F(x)$ such that the process function $Y_P=F(X_p)$ is satisfied. This operation is well-performed by controllers and the invention as represented by the technique 10 does not interfere with that function of controller 12.

Figure 1A:
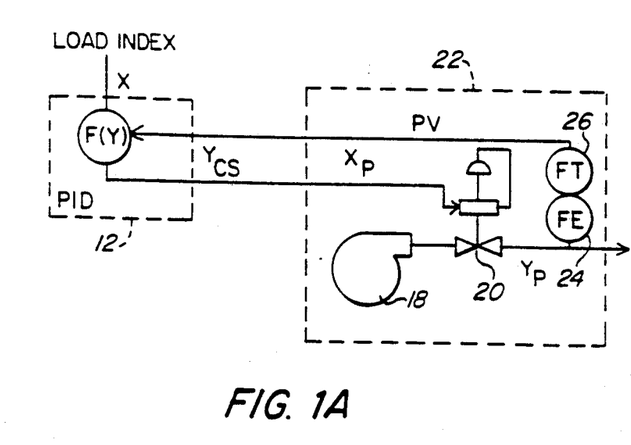
FIG. 1A is a block diagram for a typical conventional process and controller.
Figure 1B:
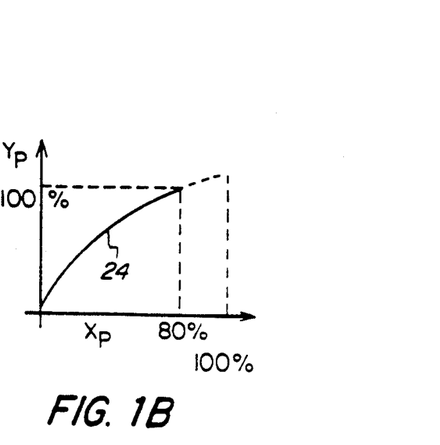
FIG. 1B is a response curve for the system of FIG. 1A.

Assume, for example with reference to FIG. 1A that a water pump 18 delivers water through a flow control valve 20 in a process 22 such that during initial commissioning the flow vs. loading signal ($Y_P=F(X_P)$) is represented by FIG. 1B. Feedback elements 24 and 26 are respectively a flow sensor and flow transmitter for generating a process variable (PV) signal.

Over time, variations in the performance of process components can occur. For example, the impeller (not shown) in pump 18 may wear, thus requiring a greater opening of valve 20 for each setting of X to satisfy the $Y_P=F(x)$ relationship. The error resolution capability of the controller 12 normally can satisfy the changing relationship. However, because the original gain setting is less than optimum, the controller operation tends to drift away from its optimum setting, whereupon there is an increasing dependence on integral action to resolve the error.

One can at that point fix the pump, but bear in mind that it is not necessarily apparent that the pump is a problem. Alternatively, one can retune or recharacterize the control system represented by controller 12.

Figure 1C:
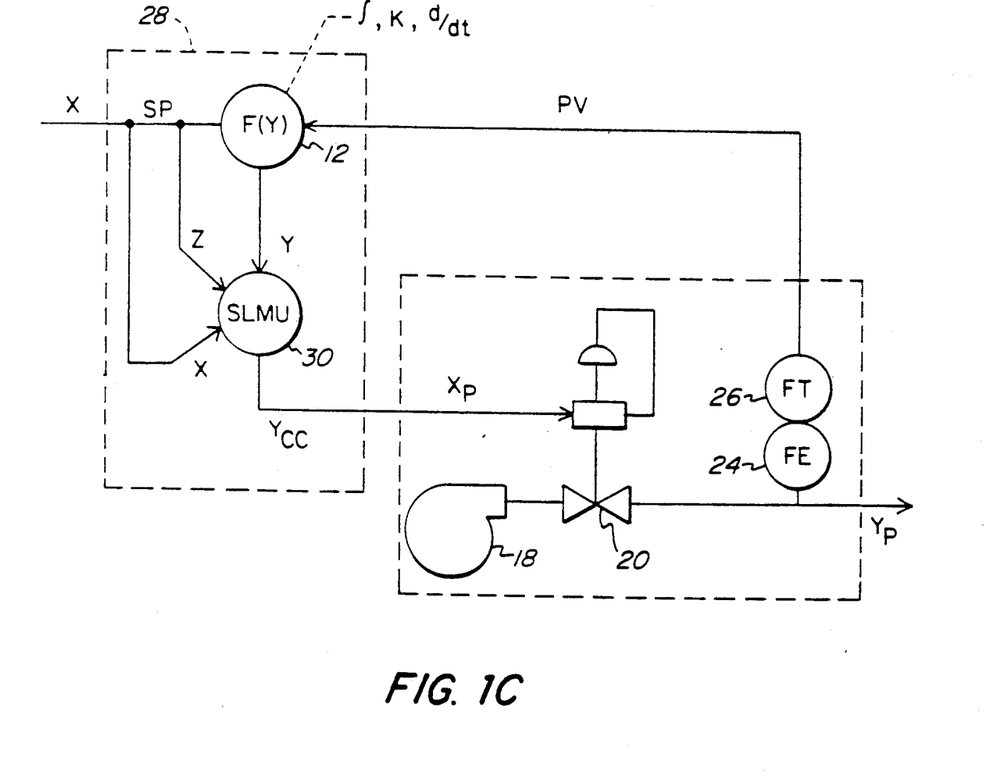
FIG. 1C is a block diagram of a process, a controller and a device in accordance with the invention.

When a device 30 using the technique 10 is included as part of the control system 28 as shown in FIG. 1C, the needed value for the output $Y_{CS}$ from the controller 12 at a value of X is memorized and automatically supplied without retuning. In addition, changes from the originally-commissioned values can be identified and used to trouble shoot In a sense, error resolution capabilities are used to provide a continual error prevention by continual updating.

Returning to FIG. 1, a technique for operating the device 30 is illustrated. At 40 values are entered for the reference index signal X, the controller output Y and the setpoint Z for the controller. At 41 a currently-correct output value $Y_{CC}$ is used to replace the stored last-correct value $Y_{LC}$ for the reference index if that has changed. The stored last-correct values are those values which have been found to previously satisfy the process regulated by the controller 12 for respectively-associated reference index values X. At 42 a modifier M is generated by comparing the setpoint value Z with the controller output Y. The modifier signal is used at 44 to correct a stored last-correct value of the controller output. This corrected value is stored at 46 as a currently correct value $Y_{CC}$ for the reference index value entered at 46 and is output at 48 to regulate the process element.

Figure 2:
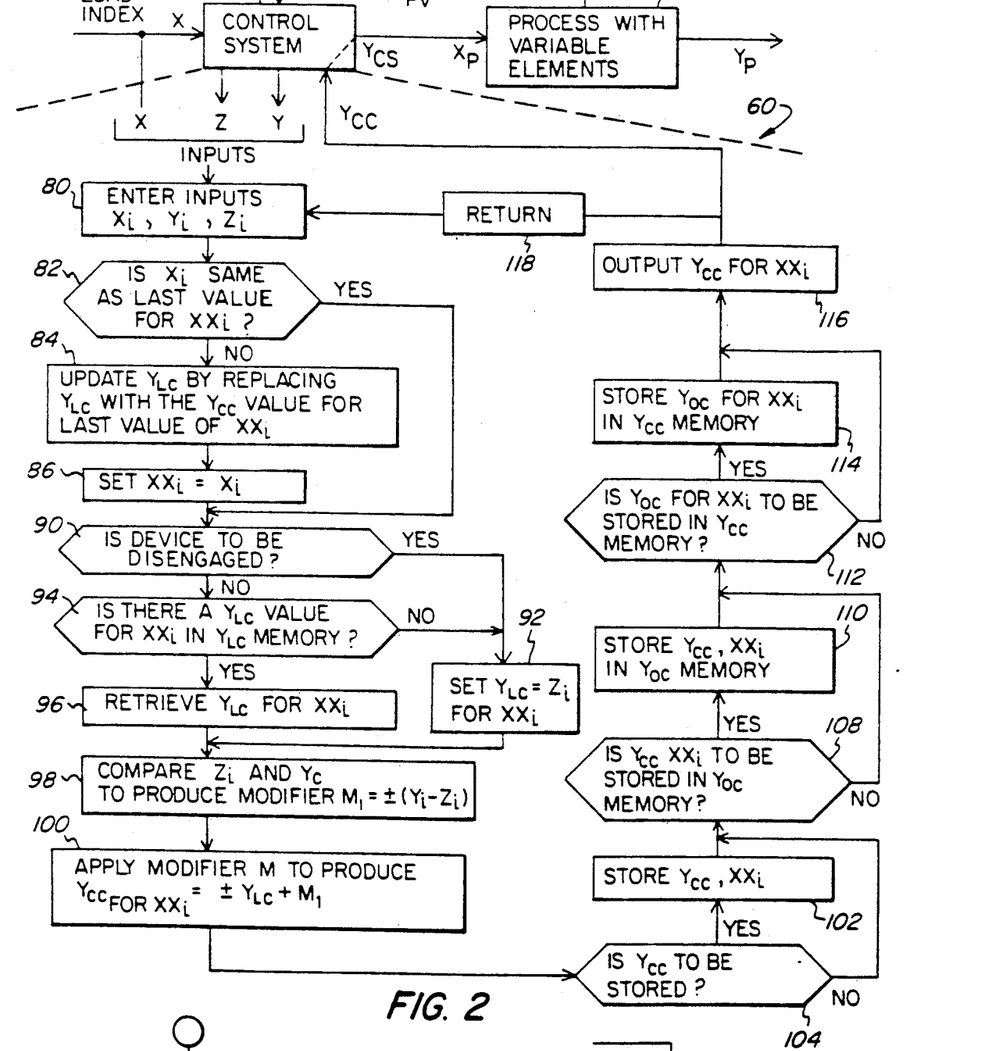
FIG. 2 is a flow chart illustrating the operation of the invention.

The technique 10 of FIG. 1 can be considered as a self-learning memory unit (SLMU) which automatically learns what is the correct output value for a particular input and causes this correct output to be applied the next time the same reference index value occurs. In essence, the SLMU is a self-updatable function generator. The SLMU does not interfere with the basic function of controller 12 but is an add-on feature by way of separate hardware, firmware or logic for the error-resolving controller. The SLMU 30 may, therefore, be a part of controller 12 or a separate device Note that SLMU 30 operates by recalling from its memory a previously-stored value $Y_{LC}$ for the specific index X. If an error arises between the setpoint Z and the output Y, then the $Y_{LC}$ value is adjusted using the controller output and setpoint so as to produce a proper currently-correct output $Y_{CC}$. Only when the index X has moved to another value is the previous last-correct value, $Y_{LC}$, updated by replacing it with the last currently-correct value $Y_{CC}$ for the previous index X. This assures that normal control system responses are not affected by the updating process FIG. 2 illustrates the invention with greater detail. A control system 56 is shown regulating a process 14 with variable elements. A process variable feedback signal PV is applied to controller 12 in system 56. The output signal Y and setpoint Z and reference index signal X are applied to an SLMU 60 made in accordance with the invention. The reference index X can be the same as setpoint Z, or Z can be some function of X including being a fixed value, but for purposes of general illustration, these are shown as separate inputs to device 60.

The SLMU can be a separate device or a part of control system 56.

Figure 5:
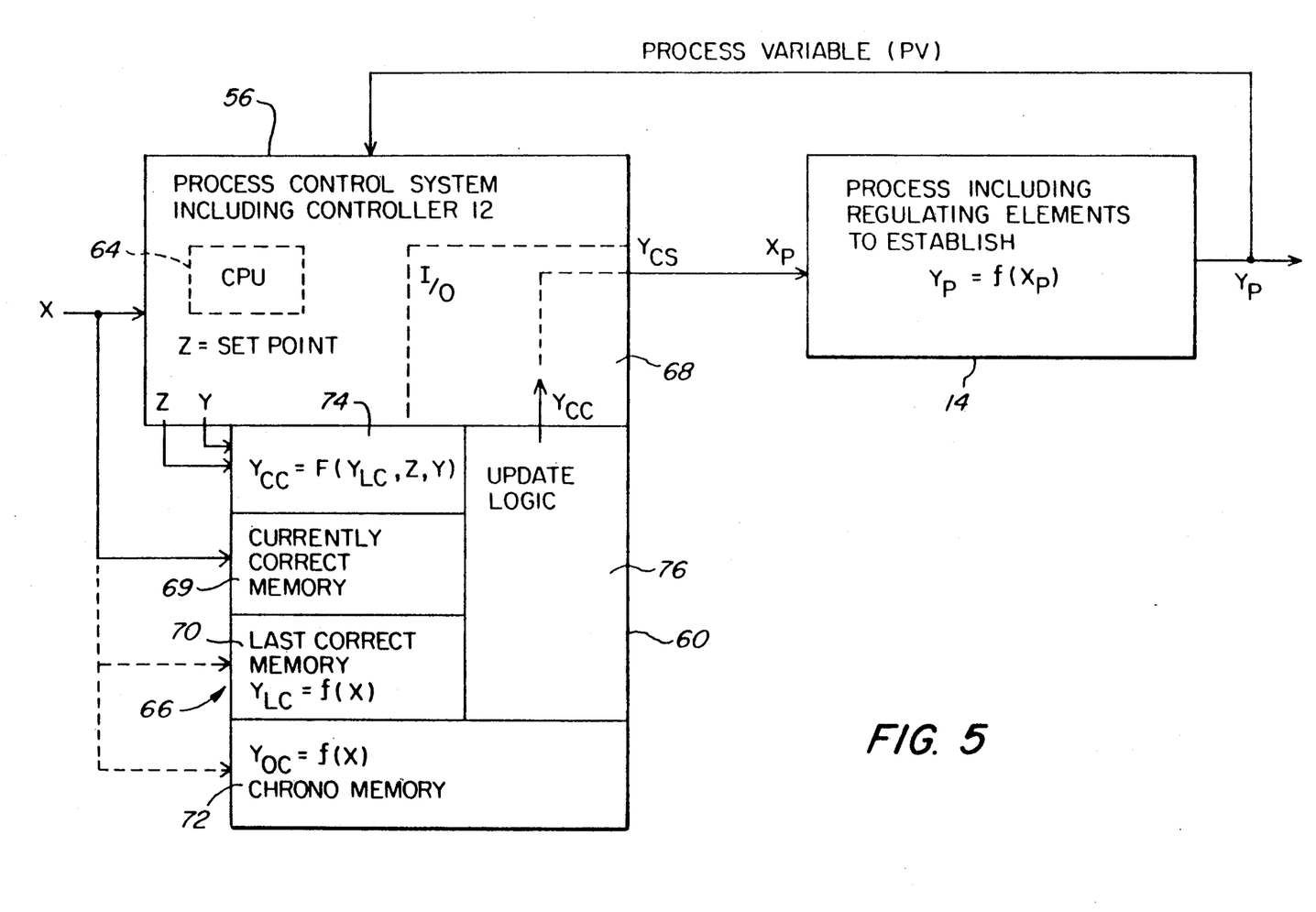
FIG. 5 is a block diagram for a device in accordance with the invention.

Thus, with reference to FIG. 5, the SLMU 60 uses a microprocessor 64, a memory 66 and input/output port 68 to receive and output signals. Appropriate analog-to-digital and digital-to-analog converters may be used to operate with the various types of signals generated in or required by controller 12 and variable control and transmitter elements in process 14. It should be noted that mechanical and electronic devices can be manufactured as well to carry out the logic presented.

The SLMU 60 can employ a programmable computer or a computer or chip in which the program steps are fixed as firmware. Device 60 can be an analog device with signal storing capabilities. The memory 66 includes various sections such as section 69 for storing currently-correct values $Y_{CC}$ as a function of reference index X, section 70 for storing last correct values $Y_{LC}$ as a function of X and a chrono section 72 for storing a set of originally correct values $Y_{OC}$ as a function of X. The reference index signal X is shown as applied to each memory section though it can be stored in a single memory segment or just used to designate the memory location in which the associated values $Y_{LC}$ or $Y_{OC}$ are to be stored.

The SLMU 60 includes a computational section 74 and an update logic section 76. These sections can be part of a computer program in a separate device or be made a part of the program of controller 12. In FIG. 5 a single CPU 64 is shown for servicing the controller and SLMU 60 functions in accordance with appropriate program-control codes. Since a controller operation is well-known, the description of FIG. 2 focuses on the SLMU 60 and employs the memory, logic and computational sections in a manner as described below.

SLMU 60 at 80 in FIG. 2 enters values for the reference index X, the setpoint Z and the controller output Y. At 82 a test is made whether the reference index signal X has changed, such as relative to the previous value $XX_i$. If so, then at 84 the last-correct value $Y_{LC}$ for $XX_i$ in the last-correct memory section 70 is replaced with the currently-correct value $Y_{CC}$ for $XX_i$ and at 86 the new reference index value $X_i$ is stored as $XX_i$.

A check is made at 90, by checking an appropriate flag, whether the SLMU is to be bypassed. This may, for example, be desired during initial commissioning when various conditions and parameters are being tested. If so, then the bypass is completed at 92 by forcing the value for $Y_{LC}$ for this particular cycle and not in memory section 70, equal to the setpoint $Z_i$. If no bypass is required, a test made at 94 whether a value for the input signal X equal to $XX_i$ is stored in last-correct memory section 70, see FIG. 5. If such output value for $XX_i$ is so stored with a value for $Y_{LC}$, then at 96 this is retrieved.

At 98 a modifier signal M' is produced with which a currently-correct output signal can be generated as a function of the error resolution efforts by the controller 12. The modifier value is thus derived by comparing the value $Z_i$ with the output signal $Y_i$. The comparison can be obtained as an arithmetic difference Y-X or as a ratio Y/Z or in such other form as will produce a modifier M that will produce a desired and appropriate computational adjustment to the $Y_{LC}$ value based on controller output and setpoint inequities.

The modifier signal is then applied at 100 to the stored value for $Y_{LC}$ that was last found to be correct for the reference index signal $XX_i$ to produce a currently correct value $Y_{CC}$. The last corrected value is correct by the modifier signal $M_1$ by way of an arithmetic adjustment such as $Y_{CC} = \pm Y_{LC} \div M_1$ where $M_1 = \pm(Y_i - Z_i)$. The signs are determined dependent upon the particular application.

Figure 3:
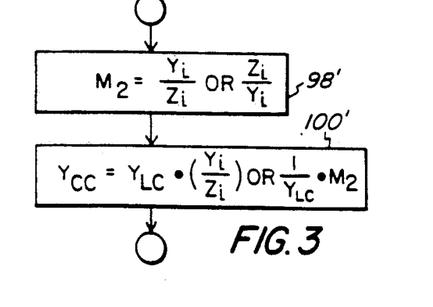
FIG. 3 is a flow chart for use in generating an alternate modifier used in the technique of FIG. 2.
Figure 4:
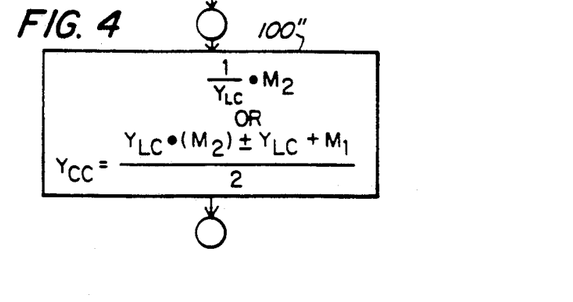
FIG. 4 is an alternate step for generating a currently correct output for the technique of FIG. 2.

Alternatively, as illustrated at 98' and 100' in FIG. 3, an algebraic modifier M can be produced at 98' by way of $M_2 = Y_i/Z_i$ or $Z_i/Y_i$ and a correction of the last-correct value is made at 100' to form $Y_{CC} = Y_{LC} \cdot M_2$ or $1/Y_{LC} \cdot M_2$. In FIG. 4, a currently correct value $Y_{CC}$ is generated at 100" by using both modifiers $M_1$ and $M_2$ as shown to generate their average value. Other computational modifiers are possible, the gain/bias alternatives given are typical of these used.

During regular operation, the currently-correct value $Y_{CC}$ is stored at 102 as a function of the input signal $XX_i$ in memory section 69. This storage step can be bypassed at 104 if, for example, during start-up or shutdown, abnormal conditions are likely to arise. A flag is used to implement or defeat the bypass.

A key advantage of the SLMU device 60 is that deviations from originally-commissioned conditions can be conveniently obtained. For example, one can store the currently correct values $Y_{CC}$ for a range of reference index values X in originally-correct memory section 72 at the time the control system 55 and process 14 are first satisfactorily commissioned. This then permits one to inspect for deviations from these original values during the operation. Thus, if a $Y_{CC}$ value setting of 25% was sufficient to satisfy a reference index value $X_i$ of say 40% at startup but now requires say 35%, then this change is indicative of a potential problem. The problem can be caused by an excessive wear of a pump impeller, or a partial pipe blockage, some other equipment failure, or even elected changes in process operating parameters. The significant advantage is that an early diagnosis of a deteriorating or changed trend can be made and corrective steps can be taken. Hence, at 108 a check is made whether the currently correct value for $XX_i$ is to be stored in the chrono memory 72, if so the storing step is carried out at 110.

The accumulation of originally-correct values $Y_{OC}$ in chrono memory 72 for different load index values X can be carried out as part of an original commissioning procedure. For example, an appropriate $Y_{OC}$ storing flag used at step 108 can be activated and, as long as this is active, all currently correct values are stored for their respective reference index values $X_i$. The operator can manually sequence the reference index value X through its range to produce the required store $Y_{OC}$ values. When this is completed, the $Y_{OC}$ storing flag is reset.

Under certain circumstances, such as when the replacement of the worn pump impeller warrants an assumption that original operating characteristics will be restored, it may be desirable to use the values stored in the chrono memory 72 as the currently correct value. In such case, an appropriate flag is set and tested at 112. If active, the originally-correct value $Y_{OC}$ for $XX_i$ is stored as $Y_{CC}$ in the currently-correct memory at 114. If the test 112 results in a negative answer, the currently-correct value $Y_{CC}$ for $XX_i$ is outputted at 116 to regulate the appropriate element in process 14. A return is then made at 118 to step 80 to repeat the cycle.

Note that the steps 108, 110, 112 and 114 are shown to illustrate advantages and features of the invention but are not essential and could be deleted. Consider, however, that the updating features of the SLMU afford useful trend establishment and trouble-shooting information when coupled with a historical reference.

Figure 6:
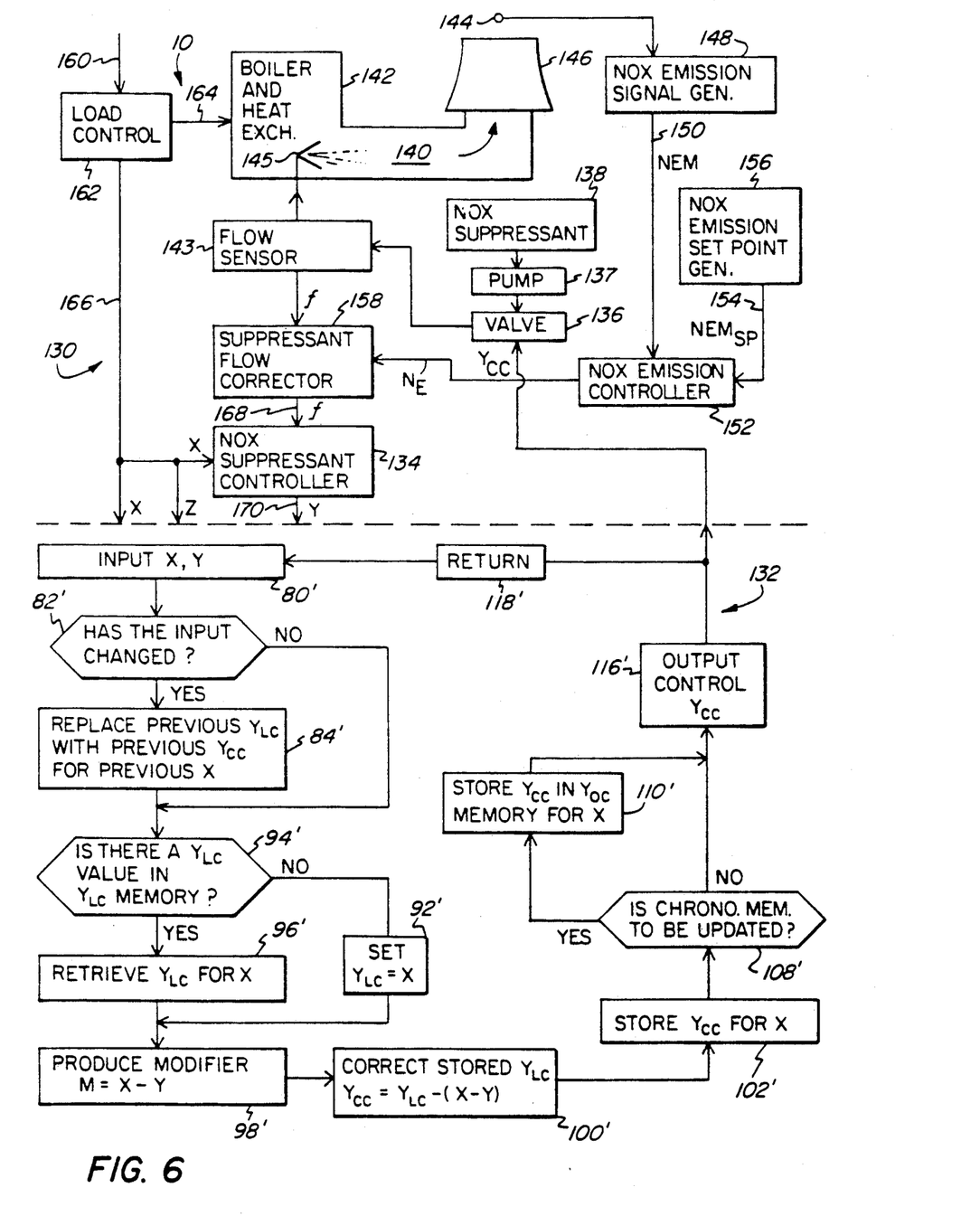
FIG. 6 is a block diagram of a process regulated by a controller and a flow chart for a device and method in accordance with the invention.

With reference to FIG. 6, the invention is shown for use with an exemplary process 130 to serve as a self-adaptive function generator 132 for a controller 134 that would normally directly operate a valve 136 at the output of a pump 137.

The process 130 is for the regulation of the feed of $NO_X$ suppressing material 138 into the flue gas 140 from a boiler 142. The material flow is measured by flow sensor 143 and injected into the flue gas through a nozzle 145.

The process 130 includes a $NO_X$ emission sensor 144 at the outflow or chimney 146 and, together with a circuit 148, produces a $NO_X$ emission signal NEM on line 150. The $NO_X$ emission signal is applied to a $NO_X$ emission controller 152 together with a $NO_X$ setpoint signal $NEM_{SP}$ on a line 154 from a setpoint generator 156. The $NO_X$ emission controller 152 produces a suitable error signal, $N_e$ to $NO_X$ suppressant setpoint corrector 158.

The amount of $NO_X$ suppressing material required is a function of the load index setting 160 for boiler 142 as determined with control 162. The latter thus provides in addition to a boiler load setting signal on line 164 a $NO_X$ suppressant demand or setpoint signal X on line 166 that is applied to $NO_X$ suppressant flow controller 134. This setpoint input to the latter controller is undergoes correction by the setpoint corrector 158 prior to its being inputted to controller 134.

The function of controller 134 is to provide a suitable output signal Y on line 170 to operate valve 136 and thus regulate the process 130. Appropriate tuning constants for proportional, integral and/or derivative control may be set in controller 134 pursuant to process operation requirements.

In the operation of controller 134, its output Y on line 170 is intended for this example to be equal to the inputted setpoint index signal $X_C$. Stated alternatively, the input signal $X_C$ is representative of a desired output Y from controller 134 and acts as the setpoint for the controller.

In many processes, the very elements used to regulate the process, whether this be a valve, pump, or other type of controlling element, can have a non-linear characteristic. The controller 134 can handle such characteristic, but in doing so may drive its operation away from its optimum, such as towards an extreme maximum. In such case, further increases from the controller output may try to exceed the maximum possible setting for the element.

With the use of SLMU 132, similar steps are executed as described with reference to FIG. 2. Accordingly, the steps are identified with like, but primed numerals. The advantages provided through the use of the SLMU 132 can be appreciated with reference to the error resolution process of a typical controller in the absence of the invention.

The controller 134 does nothing to enhance the system's ability to prevent errors. Rather, when an error occurs, the controller reacts to resolve the error within acceptable operational tolerances for the process.

For example, errors from off-design or poor commission conditions are not always fixed for all of the values X of the input load index. Hence, error resolution becomes necessary whenever the index X is set to a value for which such error condition arises. In other words, controller 134 does not learn from past performance requirements and is condemned to duplicate its prior error resolution efforts.

With the use of the SLMU such as 132, the results of prior output requirements are remembered and the appropriate last-correct value $Y_{LC}$ is used to avoid repeat of an error-resolution for that particular input index.

Figure 7:
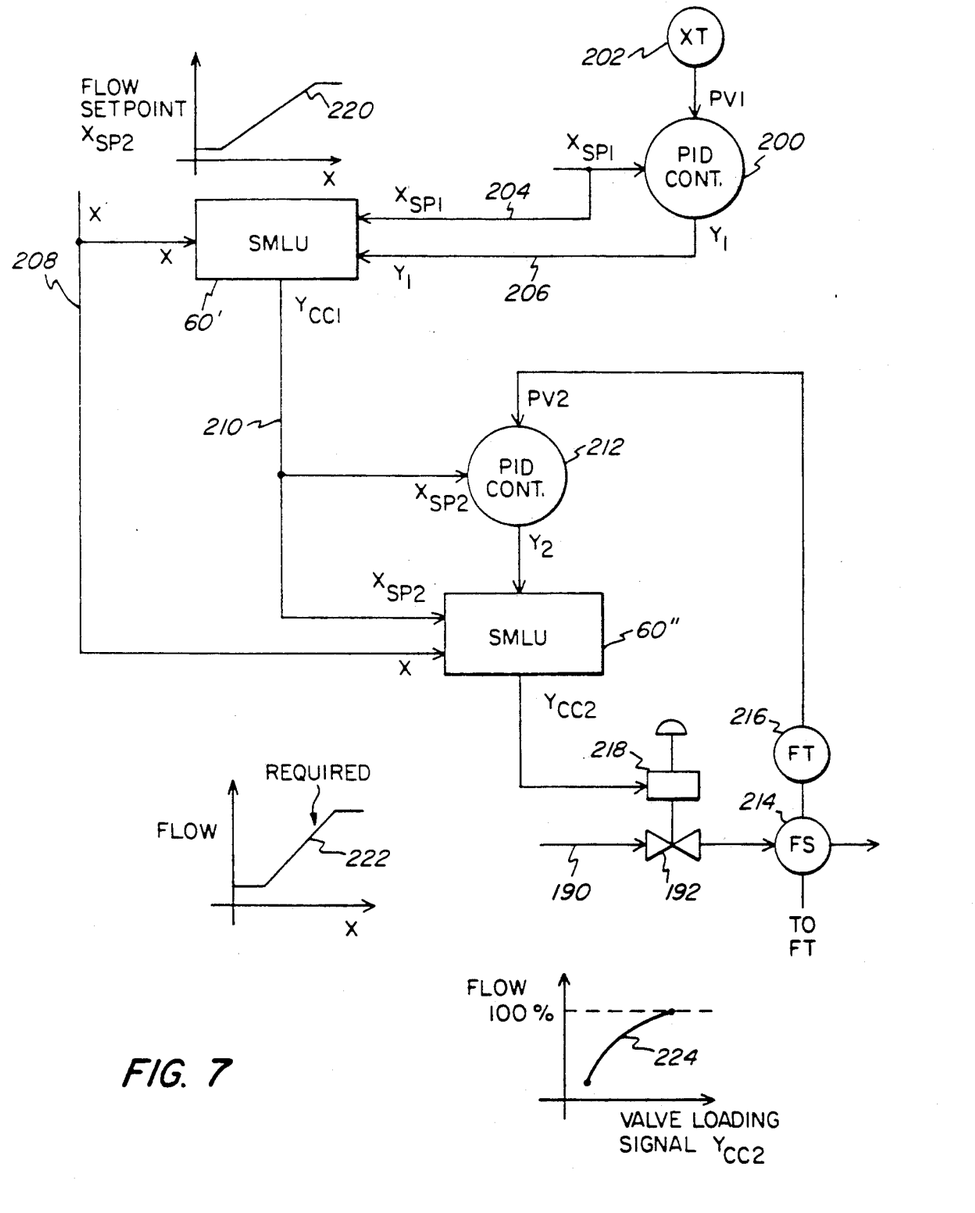
FIG. 7 is a block diagram view of a system using a number of devices in accordance with the invention.

With reference to FIG. 7, the invention is shown in use with different processes. Several SLMU devices are used to control flow through a pipe 190 with a control valve 192 using a flow setpoint adjustment based on a secondary process variable. Specifically, a first SLMU device 60', similar to that shown and described with reference to FIG. 2, is operated with a controller 200 which responds to a secondary process variable PV1 derived from a device 202 performing a particular secondary analysis. The controller 200 employs a setpoint input $X_{SP1}$ on line 204 and produces an output $Y_1$ on line 206.

SLMU 60' responds to a reference index X on line 208, the setpoint value on line 204 and controller output $Y_1$ in the manner as described with reference to FIG. 2. Thus, a currently-correct signal $Y_{CC1}$ is outputted on line 210 and becomes the setpoint input, $X_{SP2}$ for a controller 212 and SLMU 60''.

Controller 212 responds to a process variable signal PV2 derived from a flow sensor 214 and flow signal transmitter 216 operative to sense fluid flow through pipe 190. The output $Y_2$ of controller 212 is applied to SLMU 60'' with the load index X and setpoint signal $X_{SP2}$. SLMU 60'' thus provides a currently-correct output $Y_{CC2}$ that is applied to regulate the actuator 218 for valve 192.

In the control system of FIG. 7, SLMU 60' operates as a self-updating function generator with a characteristic that automatically assumes a shape as suggested with the curve 220. This curve shows the desired non-linear characteristic for the setpoint $X_{SP2}$.

The desired flow characteristic can be as, for example, illustrated with curve 222. The resultant actual valve opening characteristic needed to achieve the required flow is represented, for example, by curve 224.

Referencing FIG. 6, it should be apparent that application of multiple SLMU's as depicted on FIG. 7 could be so accomplished when the secondary process variable PV1 is defined to be "NEM" and the suppressant flow corrector 158 is eliminated and the SLMU used as a setpoint generator for 134.

Having thus described several embodiments of the invention, its advantages can be appreciated. With a self-learning memory unit in accordance with the invention, an efficient and convenient combination of error prevention and error resolution is realized. A PID controller's error resolution efficiency is maximized by minimizing the potential for variable errors encountered throughout the operating range for the index value X. The SLMU can be applied anywhere it is relation to a load index and for which a controller is used to generate or manipulate that condition.

Variations from the described embodiments can be made without departing from the spirit and scope of the invention. For example, the storage of last-correct values $Y_{LC}$ for the operating range of the load index can be extensive, depending upon the precision or decimal places used for the load index. For example, if X has a resolution that includes a tenth of a percentage, a total of a thousand load index values must be stored. This can be reduced by implementing a rounding step for the load index X. Such rounding step can be to any convenient scale. For example, if rounded to the nearest whole integer percentage point, the maximum number of last-correct values $Y_{LC}$ that need to be stored is reduced to a hundred. Alternatively, by computation of appropriate gain or slope valves interconnecting line segments can be generated as is commonly done with many currently available segment characterizers. Clearly, one must evaluate the benefits derived from generating and storing functions of a high degree of accuracy in relation to the amount of memory required to achieve that accuracy.

What is claimed is:

1. A device for self-updating its output to characteristics of or changes in a process that is regulated by a controller, wherein the controller produces an output signal that is intended to resolve an error signal between a setpoint signal and an input signal to the controller, comprising:
    means for storing last-correct signal values that are representative of values that satisfied the process for respectively-associated index signal values;
    means for modifying a last-correct signal value as a function of said error signal to produce a control signal representative of a currently-correct value for the operation of the process at a respectively-associated index signal value; and
    means for coupling the currently-correct control signal value to operate the process to resolve the error signal.

2. The device as claimed in claim 1 wherein the means for storing last-correct values includes means for replacing a last-correct value with a currently-correct control signal value at a time selected to avoid interference with the operation by the controller of the process.

3. The device as claimed in claim 2 wherein the replacing means comprises:
    means for detecting when an index signal value is changed from a first value to a second value; and
    means responsive to said detecting means for storing the currently-correct control signal value associated with the first value of the index signal as an up-dated last-correct signal value associated with said first value.

4. The device as claimed in claim 3 wherein said modifying means comprises:
    means for comparing the setpoint signal with the controller output signal to produce a modifier signal representative thereof; and
    means for applying the modifier signal to a said stored last-correct signal to generate a currently-correct control signal value for operating the process.

5. The device as claimed in claim 4 and further comprising:
    means for storing, for a range of index signal values, currently-correct control signals generated during an initial commissioning of the device.

6. The device as claimed in claim 5 wherein the comparing mean comprises:
    means for producing a modifier signal that is representative of a difference between the setpoint signal and the controller output signal.

7. The device as claimed in claim 5 wherein the comparing means comprises:
    means for producing a modifier signal that is representative of a ratio between the setpoint signal and the controller output signal.

8. The device as claimed in claim 5 wherein the comparing means comprises:
    means for producing a first modifier signal that is representative of the difference between a setpoint signal and the controller output signal;
    means for producing a second modifier signal that is representative of a ratio between the setpoint signal and the controller output signal; and
    means for combining the first and second modifier signals to generate a third modifier signal representative of an average between the first and second modifier signals.

9. The device as claimed in claim 5 and further comprising:
    means for determining a bypass function of the device; and
    means responsive to the bypassing means for effectively setting the last correct control signal equal to the setpoint signal.

10. A device for self-updating its output to characteristics of or changes in a process that is regulated by a controller, wherein the controller produces an output signal that is intended to resolve an error relative to a setpoint signal, comprising:
    means for storing last-correct values that are representative of values that satisfied the process for respectively associated input signal values;
    means for effectively comparing the setpoint signal with the controller output signal for generating a modifier signal representative thereof;
    means for applying the modifier signal to a last-correct signal value to produce a control signal that is representative of a currently-correct value for the operation of the process at an input signal value;
    means for coupling the currently-correct control signal to operate the process; and
    means for replacing a last correct signal value with a currently-correct control signal value when the input signal has changed.

11. The device as claimed in claim 10 and further comprising:
    means responsive to the input signal for detecting a change thereof; and
    means responsive to the change detecting means for actuating the replacing means.

12. The device as claimed in claim 11 and further comprising:
    means for storing the currently-correct control signal.

13. A device for self-adapting its output to the characteristics of or changes in a process or a process element that is regulated by a controller, wherein the controller produces an output signal in response to an error between a setpoint signal for the controller and a feedback signal from a process operation monitor such as a sensor or the like and wherein an input signal is provided as a reference index input, comprising:
    memory means for storing last correct values as a function of input signal values where the last correct values are representative of values that satisfied the process for respectively associated input signal values;
    means responsive to the setpoint signal, the controller output signal and a last correct output value for generating a currently-correct control signal value for an input signal value;
    means for coupling the currently-correct control signal value to operate the process; and
    means for replacing a last-correct value with the currently correct control signal value, associated with the same input signal value, at a time selected to avoid interference with the operation of the controller in its regulation of the process.

14. The device as claimed in claim 13 wherein the replacing means includes:
   means for detecting a change in the input signal; and
   means responsive to the detected change for replacing the last-correct value, which is associated with the value of the input signal before the detected change, with the last currently-correct control signal value in effect before the detected change.

15. The device as claimed in claim 14 and further including:
   means for storing a plurality of currently-correct control signal values respectively associated with a range of input signal values at a predetermined time.

16. The device as claimed in claim 15 wherein the means for generating the currently-correct signal value further includes:
   means for comparing the setpoint signal with the controller output signal for generating a modifier signal representative of the error being resolved by the controller; and
   means for applying the modifier signal to the last correct signal value for generating said currently-correct control signal.

17. The method as claimed in claim 16 and wherein the replacing step further comprising the steps of:
   determining when the index signal has changed to a new value; and
   initiating the replacing step when a change in the index signal has been determined.

18. A method for adapting the output of a controller to characteristics of or changes in a process or of a process element, that is regulated by the controller, wherein the controller produces an output signal in response to an error between a setpoint signal for the controller and an input signal to the controller, comprising the steps of:
   storing last-correct values as a function of an index signal, said last correct values being representative of values that satisfy the process operation for respectively associated index signals;
   modifying a last-correct signal value as a function of the error to produce a currently-correct control signal associated with an index signal value;
   applying the currently-correct control signal to the process for regulation thereof; and
   replacing the stored last-correct signal value associated with an index signal value with the currently-correct control signal value associated with the same index signal value, at a time selected to minimize interference with the controller's regulation of the process.

* * * * *